Aug. 1, 1967   H. A. SPETS   3,333,295
FISH SKINNING TOOL
Filed Sept. 13, 1965
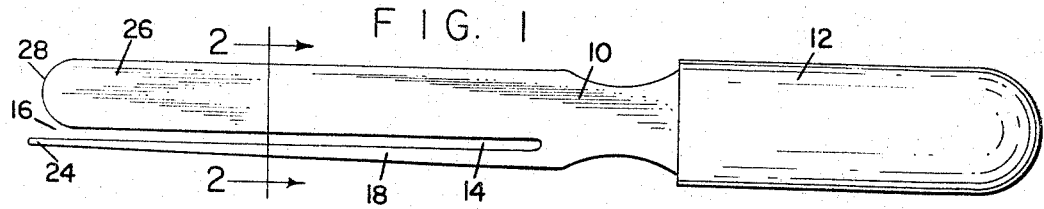
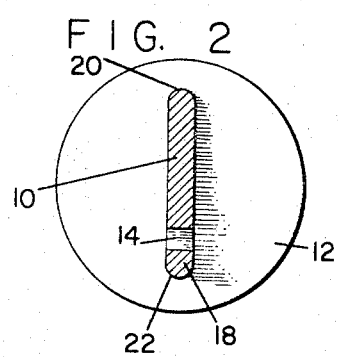
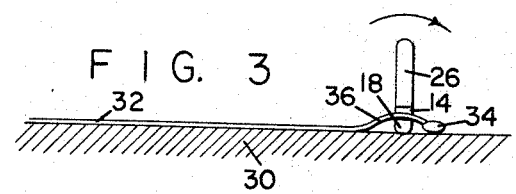
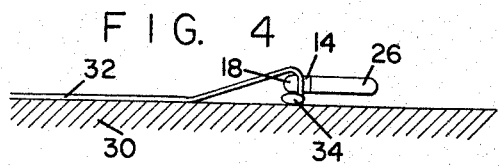
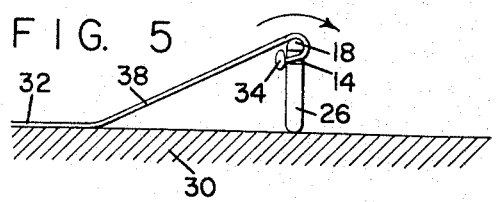
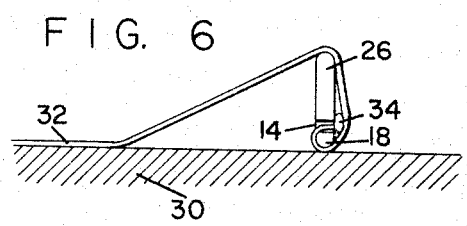
INVENTOR
HERBERT A. SPETS
BY *Charles R. Fay*
ATTORNEY

United States Patent Office 3,333,295
Patented Aug. 1, 1967

3,333,295
FISH SKINNING TOOL
Herbert A. Spets, 54 Old Common Road,
Auburn, Mass. 01501
Filed Sept. 13, 1965, Ser. No. 486,861
1 Claim. (Cl. 17—7)

This invention relates to a fish skinning tool and it has for its principal object the provision of a very staple device for skinning fish. It is very easily cleaned because it has no moving parts and is easily and inexpensively manufactured, being in the form of a flat blade having a generally longitudinal slot therein extending from a free end inwardly toward the opposite end of the blade, which is provided with a handle.

This construction forms a tine having a relatively sharp free end in combination with a rounded off free-ended piece forming the main body portion of the blade, the tine being insertable under the skin of the fish, say for instance adjacent the gill or gill plate, with the main body portion of the blade extending at a right angle to the body of the fish. If this is done right-handed and the blade turned in a clockwise direction, the skin will be lifted up from the fish very easily and wound on the blade so that when the fish is completely skinned all that is necessary to do is to push the wrapped-up skin from the blade and rinse off the blade to clean it, avoiding the necessity of rather cumbersome cleaning of moving parts as with fish skinners of the prior art.

Other object and advantages of the invention will appear hereinafter.

Reference is to be had to the accompanying drawings in which:

FIG. 1 is a view in elevation illustrating the new fish skinning tool;

FIG. 2 is a section on line 2—2 of FIG. 1 on an enlarged scale, and

FIGS. 3, 4, 5 and 6 are diagrammatic views illustrating the action of the fish skinning implement.

The device is shown in FIGS. 1 and 2 and it is an extremely simple device comprising a flat blade 10 which may have a handle 12 mounted at one end thereof. The flat blade may be of any convenient length and the device may be made and sold in different sizes, depending upon the size of fish which is to be skinned. In any event, the blade is provided with an elongated narrow slot 14. This slot originates at the free end of the blade 10 as at 16 and it forms at tine 18. As clearly shown in FIG. 2, the side walls of the slot 14 may be straight and although the outer edges at 20 and 22 of the blade 10 may be rounded over, it is preferred that the side walls of slot 14 shall be substantially square-edged as shown in FIG. 2.

The tine 18 is preferably straight, the slot 14 extending from a narrow penetrating point 24 for the tine inwardly as clearly shown in FIG. 1 for a substantial distance toward the handle. The tine is very narrow relative to the main body portion of the blade 26, which is relatively wide, having a rounded forward portion at 28 which is even with or slightly retracted inwardly from the extreme point of the tine, and this construction provides the pointed, narrow tine 18 which is relatively small compared to the main body portion 26 of the blade.

As shown in FIGS. 3, 4, 5 and 6, the action of the device is disclosed. The reference character 30 represents the body or flesh of the fish to be skinned and the reference character 32 indicates the skin in its natural attached condition with respect to the body 30. The fish should be out along the belly to the tail and along the back so as to define the area of the skin which is to be removed and the reference numeral 34 indicates a gill plate or cover near the head of the fish.

The tine 18 is inserted at its sharp end 24 under the fish skin adjacent the gill plate or cover 34. This action alone tends to initiate lifting of the skin from the body of the fish in the area indicated at 36 in FIG. 3. However the gill plate or cover 34 is still attached. The handle of the implement is then turned in a clockwise direction assuming that the operator is right-handed and is operating on the right-hand side of the fish. This brings the tine 18 and the body portion 26 of the tool to the position shown in FIG. 4, over the gill cover. From FIG. 3 to FIG. 4 the blade is turned ninety degrees. From FIG. 4 to FIG. 5 the blade turns another ninety degrees in the direction of the arrow, i.e., clockwise, and this lifts the gill cover from the body 30 and tends to start the separation of the skin from the body 30 to a much greater extent as in the area at 38. This of course is due to the fact that the slot 14 is now in the uppermost portion of the blade rather than in the lowermost portion as in FIG. 3. In any event, the fish skin is now firmly connected with respect to the blade and continued turning as in FIG. 6 rolls the skin up over the gill cover 34 and keeps on separating the skin in advance of the blade as the blade moves to the left down toward the tail end of the fish.

The same process can be carried out starting at the tail end of the fish. Also the tool can operate rotating it in a counterclockwise direction looking at FIG. 3 but it has been found that it is quicker, easier and smoother operating to turn it in the direction indicated.

Having thus described my invention and the advantages thereof, I do not wish to be limited to the details herein disclosed, otherwise than as set forth in the claim, but what I claim is:

An implement for skinning fish comprising a generally flat elongated blade having opposite generally parallel edges and a rounded forward portion and a substantially straight slot on the blade extending from said forward portion substantially straight inwardly for a major portion of the length of the blade, said slot being located closer to one edge than the other and forming at one side thereof a narrow tine having a narrow penetrating point for insertion under the skin of the fish so that the skin of the fish relatively slides up into the slot, the slot also forming in the blade at its side opposite from the tine a relatively enlarged broad portion about which the skin is wound as the blade is rotated with a part of the fish skin located in the slot, the edges of the blade and of the slot all being dull and incapable of cutting.

References Cited

UNITED STATES PATENTS

| 515,777 | 3/1894 | Krohn. | |
| 954,084 | 4/1910 | Gelbman | 17—1 |
| 2,293,892 | 8/1942 | Evinger | 30—278 |
| 2,618,810 | 11/1952 | Fishburne | 17—7 |

FOREIGN PATENTS

| 530,512 | 7/1931 | Germany. |
| 52,739 | 6/1933 | Norway. |

LUCIE H. LAUDENSLAGER, *Primary Examiner.*